(12) United States Patent
Deines et al.

(10) Patent No.: US 6,336,061 B1
(45) Date of Patent: *Jan. 1, 2002

(54) SYSTEM AND METHOD FOR ATTITUDE DETERMINATION IN GLOBAL POSITIONING SYSTEMS (GPS)

(75) Inventors: Steven D. Deines, Marion; John W. Murphy, Cedar Rapids, both of IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/510,915

(22) Filed: Feb. 22, 2000

(51) Int. Cl.[7] .................................................. G06F 7/00
(52) U.S. Cl. .................... 701/13; 701/213; 701/215; 342/357.06; 342/357.08; 342/357.11; 342/357.12
(58) Field of Search ........................ 701/13, 4, 3, 213, 701/207, 214, 215, 225; 342/26, 357.01, 357.1, 357.06, 357.12, 357.04, 352, 463, 357.11, 357.03

(56) References Cited

U.S. PATENT DOCUMENTS

| | | | |
|---|---|---|---|
| 4,644,358 A | * 2/1987 | Sekine | 342/356 |
| 5,451,964 A | 9/1995 | Babu | 342/357 |
| 5,506,588 A | 4/1996 | Diefes et al. | 342/357 |
| 5,534,875 A | 7/1996 | Diefes et al. | 342/357 |
| 5,543,804 A | 8/1996 | Buchler et al. | 342/357 |
| 5,546,309 A | 8/1996 | Johnson et al. | 364/434 |
| 5,548,293 A | 8/1996 | Cohen | 342/357 |
| 5,579,014 A | * 11/1996 | Brooksby et al. | 342/357.12 |
| 5,787,384 A | 7/1998 | Johnson | 701/216 |
| 5,805,108 A | * 9/1998 | Lennen | 342/357.12 |
| 5,825,326 A | * 10/1998 | Semler et al. | 342/357.04 |
| 5,887,269 A | * 3/1999 | Brunts et al. | 701/208 |
| 5,923,287 A | * 7/1999 | Lennen | 342/357.06 |
| 5,990,827 A | * 11/1999 | Fan et al. | 342/357.11 |
| 6,137,433 A | * 10/2000 | Zavortny et al. | 342/26 |
| 6,175,806 B1 | * 1/2001 | Thuente | 701/213 |

* cited by examiner

Primary Examiner—Jacques H. Louis-Jacques
(74) Attorney, Agent, or Firm—Nathan O. Jensen; Kyle Eppele

(57) ABSTRACT

A system for attitude determination of a platform in global positioning systems (GPS) is disclosed herein. The system includes at least two receivers and an attitude determination circuit. The receivers each include an antenna. The antenna is capable of receiving GPS signals. Each receiver also produces a representation of the received GPS signal by estimating how fast the distance from a GPS satellite to the antenna is changing by determining a rate of change of a locally generated code sequence as it changes to approximate the GPS signal transmitted by the GPS satellite. The attitude determination circuit calculates platform attitude from the rate of change determined by the receivers.

24 Claims, 3 Drawing Sheets

SYSTEM AND METHOD FOR ATTITUDE DETERMINATION IN GLOBAL POSITIONING SYSTEMS (GPS)

RELATED APPLICATIONS

The present application is related to U.S. patent application Ser. No. 09/507,876, filed on an even date herewith, entitled, "System And Method To Estimate Carrier Signal In Global Positioning Systems (GPS)" by Deines et al, assigned to the assignee of the present application.

FIELD OF THE INVENTION

The present invention relates generally to systems and methods for generating precise attitude determinations for moving vehicles. In particular, it pertains to a system and method for generating attitude determinations for moving vehicles, including aircraft and spacecraft, using the Global Positioning System (GPS).

BACKGROUND OF THE INVENTION

The Global Positing System (GPS) is a satellite-based navigation system that continuously transmits timing, frequency, and satellite position information to potential users. The GPS consists of a full constellation of twenty-four (24) satellites in half geosynchronous orbits. The position of the GPS satellites is controlled and monitored by the Department of Defense (DoD). GPS satellites continuously emit coded GPS signals.

The GPS signal contains timing information that allows a receiver to determine the time elapsed for the GPS signal to traverse the distance between the GPS satellite and the receiver, or platform. By knowing the time the GPS signal left the GPS satellite, the time the GPS signal arrived at the receiver, and the speed of the GPS signal, the receiver can determine the distance from itself to the GPS satellite. By knowing the position of the GPS satellite (ephemeris data), and the distance from itself to the GPS satellite, the receiver can successfully determine its own position by trilateration or triangulation.

The GPS signal emitted by the satellites contains an L-band carrier component (L1) transmitted at a frequency of 1.575 GHz. The L1 carrier component is modulated by a coarse acquisition (C/A) pseudorandom (PRN) code component and a data component. The PRN code provides timing information for determining when the GPS signal was broadcast. The data component provides information such as the satellite's orbital position. The carrier component allows a receiver to more easily acquire the GPS signal.

Position determination using a conventional GPS receiver is well known in the art. In conventional GPS, a receiver makes ranging measurements between an antenna coupled to the receiver and each of at least four GPS satellites in view. The receiver makes these measurements from the timing information and the satellite orbital position information obtained from the PRN code and data components of each GPS signal received. By receiving four different GPS signals, the receiver can make fairly accurate position determinations.

However, a conventional GPS receiver only allows a user to determine actual location to within tens of meters. This accuracy is not suitable for applications which require extreme precision, such as attitude determination for moving vehicles.

A more accurate version of a GPS receiver is an Ordinary Differential GPS receiver. Position determination using Ordinary Differential GPS receiver is also well known in the art. It involves the same kind of ranging measurements that are made with a conventional GPS receiver, except that a ground reference receiver at a precisely known location is utilized. Ideally, satellite ranging errors will affect the position determinations made by the user's receiver in the same way as they will the position determinations made by the nearby ground receiver. Since the location of the ground receiver is already known, the ground receiver can compare the position determination it has calculated with the actual known position. As a result, the ground receiver can accurately detect ranging errors.

From these errors, the ground receiver can compute suitable corrections which are transmitted by data link to the user's receiver. The user's receiver can then apply the corrections to its own ranging measurements so as to provide more accurate real time position determinations.

However, even with the Ordinary Differential GPS receiver, the position determinations are only accurate to within several meters. Since, as indicated earlier, attitude determination must be extremely accurate, extending Ordinary Differential GPS to attitude determination is not feasible.

An even more accurate form of a GPS receiver is a Carrier Phase Differential GPS receiver. This form of the GPS receiver utilizes the 1.575 GHz (L1) carrier component of the GPS signal on which the PRN code and the data component are superimposed. Carrier Phase Differential GPS involves generating position determinations based on the measured phase differences at two different antennas for the carrier component of a GPS signal. This technique initially requires determining the integer number of wavelengths of the carrier component which exist between the two antennas at a particular point in time. This determination is called integer ambiguity resolution.

As described, a Carrier Phase Differential GPS receiver must be able to accurately detect the carrier signal to make precise determinations of phase differences and the integer number of wavelengths. Under weak signal conditions, the carrier signal cannot be properly detected (a state known as the GPS State 3) and the phase differences and the integer number of wavelengths cannot be determined. The conventional solution for this problem has been the use of Kalman filtering. Kalman filtering is not one unique method, but is a generic name for a class of state estimators based on noisy measurements. Kalman filtering can be implemented as a specific algorithm on a general-purpose mainframe computer, mini-computer, or microcomputer operating in a batch mode or it can be implemented on a dedicated system using either DSP, ASIC, or custom VLSI processors in a real-time operating mode.

In GPS receivers, Kalman filters estimate systematic errors from the GPS navigation data. Kalman filters are able to provide the GPS with 1 Hz error updates. Quicker updates would provide more accurate estimations of carrier signals and, thus, more accurate phase determinations for use in attitude calculations. Nevertheless, even when the GPS carrier signal is strong enough to be detected (a state known as the GPS State 5), conventional GPS receiver designs have the problem of carrier cycle slip in their carrier measurements. As such, GPS carrier estimation is useful even when the carrier signal is not jammed or indiscernible.

Thus, there is a need for an improved system and method to estimate the waveform of the carrier signal of global positioning systems (GPS). Further, there is a need for more accurate location and attitude determinations when tracking of the carrier signal is not possible (GPS State 3). Further still, there is a need to have an external measurement to detect any carrier cycle slips when detection of the carrier signal is possible (GPS State 5).

SUMMARY OF THE INVENTION

One embodiment of the invention relates to a system for attitude determination of a platform in global positioning systems (GPS). The system includes at least two receivers and an attitude determination circuit. The receivers each include an antenna. The antenna is capable of receiving GPS signals. Each receiver also produces a representation of the received GPS signal by estimating how fast the distance from a GPS satellite to the antenna is changing by determining a rate of change of a locally generated code sequence as it changes to approximate the GPS signal transmitted by the GPS satellite. The attitude determination circuit calculates platform attitude from the rate of change determined by the receivers.

Another embodiment of the invention relates to a system for attitude determination of a platform in global positioning systems (GPS). The system includes at least two means for receiving GPS signals and means for calculating platform attitude from data provided by the means for receiving GPS signals. Each of said at least two means includes means for generating a code sequence for comparison with the received GPS signals; means for regulating the rate of the means for generating a code sequence; means for measuring code phase error in the GPS signal mixed with the locally generated signal; and means for determining the rate of change required of the regulating means, wherein the rate of change required of the regulating means corresponds to how fast the distance from the GPS satellite to the antenna is changing.

Another embodiment of the invention relates to a method of attitude determination for a platform in global positioning systems (GPS). The method includes receiving a GPS signal into at least two receiving units and estimating how fast the distance from a GPS satellite to the antenna is changing in response to a rate of change from the receiving units. The rate of change has a locally generated code sequence to approximate the GPS signal transmitted by the GPS satellite.

BRIEF DESCRIPTION OF THE DRAWINGS

The invention will become more fully understood from the following detailed description, taken in conjunction with the accompanying drawings, wherein like reference numerals refer to like parts, in which.

DETAILED DESCRIPTION OF THE PREFERRED EMBODIMENTS

Figure 1:
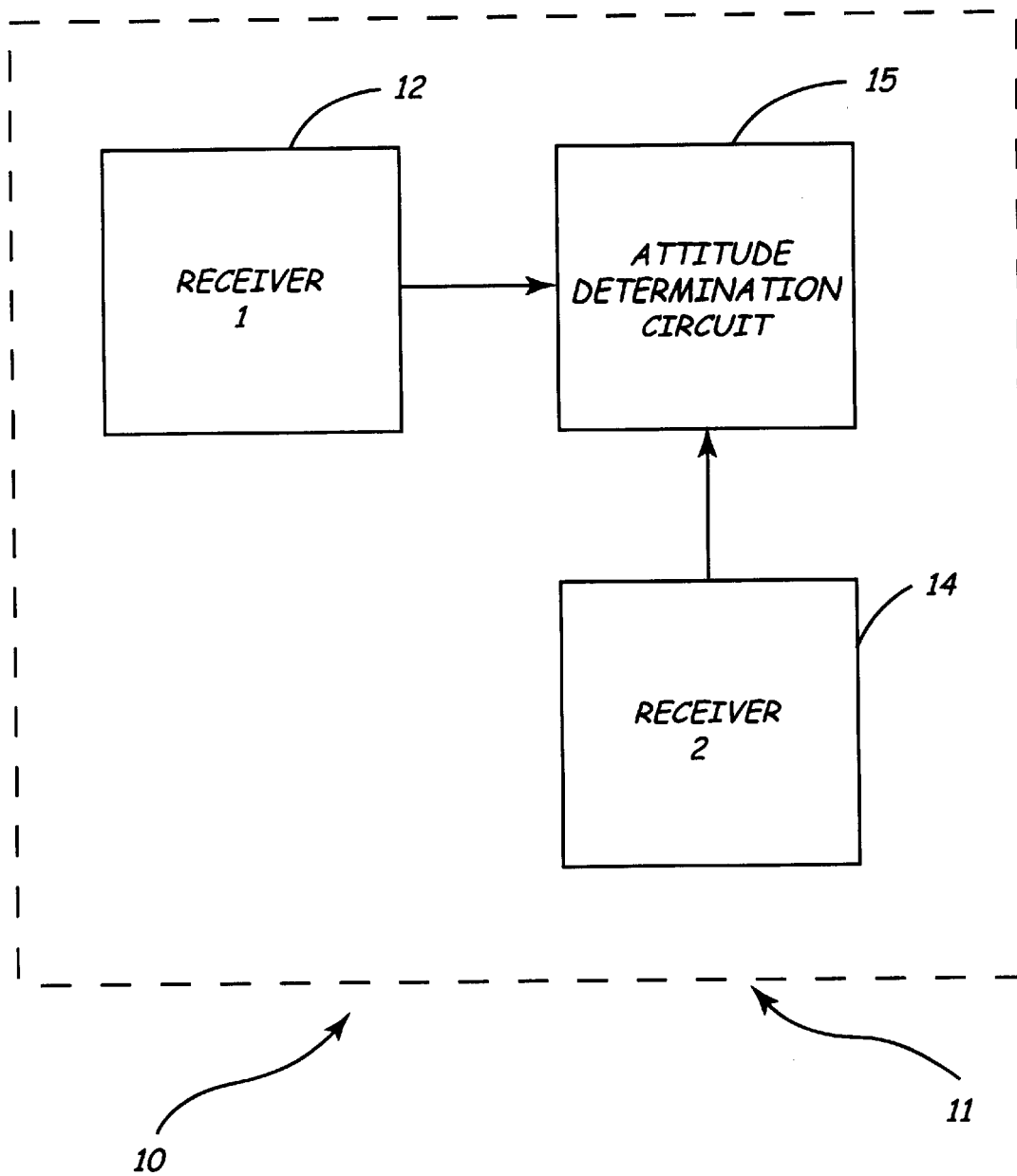
FIG. 1 is a block diagram of a positioning system, including at least two GPS receivers and an attitude determining circuit, in accordance with an exemplary embodiment of the present invention.

FIG. 1 illustrates a block diagram of a positioning system 10, including at least two Global Positioning System (GPS) receivers 12 and 14 and an attitude determination circuit 15. Receivers 12 and 14 are disposed on a platform 11. Platform 11 can be a bus, car, airplane, helicopter, spacecraft, missile, human, train, or any other moving object.

Receivers 12 and 14 produce base band representations (or estimations) of the GPS signals they receive. The base band representations of GPS signals are input to attitude determination circuit 15. From GPS data provided by receivers 12 and 14, circuit 15 calculates platform attitude (i.e. orientation).

While positioning system 10 is described as a GPS system, system 10 is alternatively an inertial navigation system (INS) integrated with a GPS system, an inclinometer combined with a GPS system, an array of accelerometers combined with a GPS system, an array of gyroscopes merged with a GPS system, or any combination of navigation or orientation systems independent of GPS. Positioning system 10 can also be utilized within a psuedo-like positioning system or other navigational system. System 10 advantageously provides attitude determination in strong signal conditions as well as in weaker signal environments. For example, system 10 tracks carrier signals in GPS State 5 and performs code tracking where carrier tracking is difficult, if not impossible, in GPS State 3. Alternatively, system 10 could be configured for use in a GLONASS (the Russian GPS system similar in operation to the U.S. NAVSTAR GPS system) or other positioning system.

Figure 2:
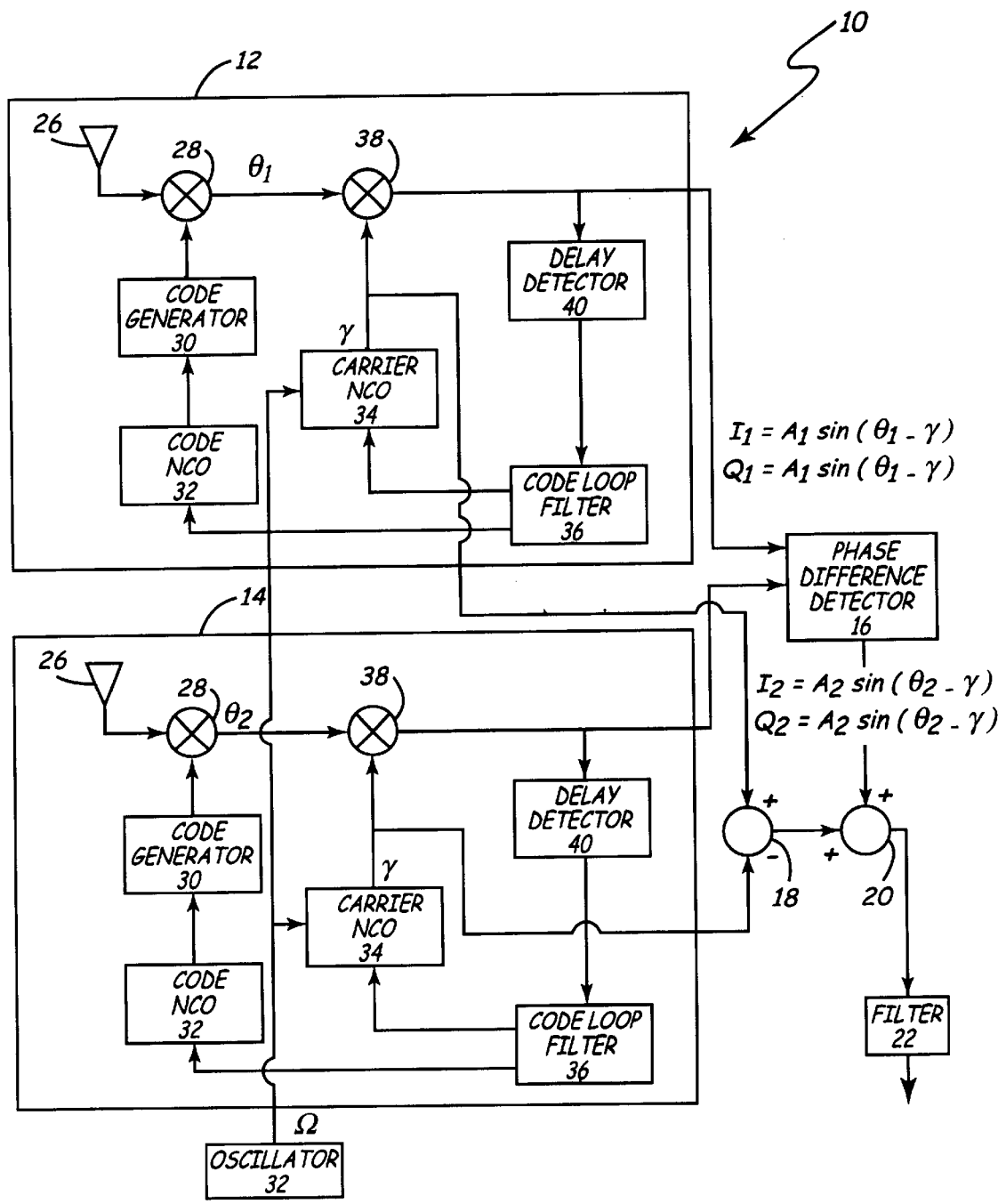
FIG. 2 is a block diagram of a system to estimate the waveform of a GPS carrier signal in accordance with the exemplary embodiment of the present invention.

FIG. 2 illustrates a more detailed block diagram of system 10. GPS receivers 12 and 14 generate an estimation of the GPS carrier signal in GPS State 3 (i.e. the GPS state where the carrier signal cannot be easily detected but the code signal can be detected). System 10 is only illustrative of one embodiment of the present invention; other embodiments of system 10 may include a variety of combinations of antennae, receivers and other components.

Positioning system 10 includes GPS receivers 12 and 14, a phase difference detector 16, an oscillator 17, a subtractor 18, an adder 20, and a filter 22. GPS receivers 12 and 14 receive a number of GPS signals from a number of GPS satellites. Preferably, receiver 12 and 14 each receives at least four (4) common GPS signals.

GPS receivers 12 and 14 produce baseband (or unmodulated) representations (or estimations) of the GPS signals they receive. The baseband representations of GPS signals are individually input to phase difference detector 16.

Phase difference detector 16 is an electronic circuit which generates the difference in phase between the GPS signal representation for a particular satellite from GPS receiver 12 and the GPS signal representation for the same particular satellite from GPS receiver 14. Both signals from receivers 12 and 14 are unmodulated. The calculated phase difference output from phase difference detector is used for location, attitude, and other GPS determinations.

Phase difference detector 16 mixes the signals from receivers 12 and 14 in order to measure the carrier phase angle directly. Detector 16 advantageously determines phase angle regardless of whether the GPS signals received by receivers 12 and 14 are strong enough to be modulated first before measuring the phase differences (GPS State 5).

Conventional positioning systems directly demodulate the carrier signal before making phase measurements needed for GPS attitude determinations. Such systems directly measure the absolute phase angle on each received signal before taking the difference between the two signals. In contrast, positioning system 10 combines the two signals and determines the relative phase angle difference between the carrier signals without having to demodulate the signals. As such, system 10 is able to measure the relative phase differences for attitude determination at signal powers which are too low for conventional systems to measure. For example, system 10 can measure a weaker GPS signal in GPS State 3, or where the code is determinable but not the carrier signal.

Oscillator 17 is any of a variety of electrical components which produces a varying, or oscillating, signal. Oscillator 17 drives components in GPS receivers 12 and 14 to produce output signals which have the same phase angle γ. Alternatively, oscillator 17 is included in at least one of receivers 12 and 14.

Subtractor 18 is any of a variety of electrical components which receives two signals and subtracts one from the other. In one embodiment of system 10, subtractor 18 takes as its inputs a locally generated carrier signal from receiver 12 and a locally generated carrier signal from receiver 14. Subtractor 18 subtracts the signals to determine which of the two receivers (i.e., receiver 12 or 14) is leading (i.e. closer in distance to a particular GPS satellite).

Adder 20 is any of a variety of electrical components which adds two signals it receives as inputs. In one embodiment of system 10, adder 20 combines the information on which signal is leading (received from subtractor 18) and the phase difference (received from the phase difference detector 16). Adder 20 outputs the combination to filter 22, which filters the signal and produces a representation of the phase difference. As mentioned previously, a variety of different GPS applications use a calculated phase difference between received GPS signals for many different calculations, including attitude, location, and other GPS determinations.

In an exemplary embodiment of positioning system 10, GPS receivers 12 and 14 each include an antenna 26, a mixer 28, a code generator 30, a code numerically controlled oscillator (NCO) 32, a carrier numerically controlled oscillator (NCO) 34, a code loop filter 36, a mixer 38, and a delay detector 40. Receivers 12 and 14 can be integral with each other or be distinct units coupled to filter 22 and detector 16.

Antenna 26 can be any of a variety of antennae capable of receiving GPS or other positioning systems signals. Mixer 28 is any of a variety of electrical components which combine input signals. In positioning system 10, mixer 28 receives as inputs the received GPS signal from antenna 26 as well as a locally generated code sequence signal from code generator 30. Mixer 28 performs a down conversion in which the signal frequency is reduced and the code sequence is taken from the received GPS signal carrier. Mixer 28 extracts the code sequence by comparing the received GPS carrier signal with the locally generated code sequence from code generator 30. The output that mixer 28 generates is a base band version of the GPS signal, including an input (I) and a quadrature (Q) portion. The I and Q portions represent both the combination of the locally generated code sequence and the received GPS carrier signal as well as the phase angle between the locally generated code sequence signal and the GPS received signal.

Code generator 30 is a pseudorandom (PRN) code local code generator which produces a PRN code sequence signal. Each satellite in the GPS includes its own PRN code. The PRN cods are known by receivers, such as GPS receivers 12 and 14, and are used to identify which GPS signals are coming from which of the 24 GPS satellites. Thus, code generator 30 produces a PRN code corresponding to the satellite from which receiver 12 (or 14) is receiving a GPS signal. Code generator 30 can be of a different type depending on the implementation of positioning system 10. The locally generated code sequence from code generator 30 is input along with the received GPS signal to mixer 28.

Code NCO 32 is an oscillator which regulates code generator 30, thus controlling the rate of PRN code generation, based on information received from code loop filter 36.

Carrier NCO 34 is an oscillator which determines the rate by which a locally generated carrier signal is mixed with the incoming GPS signal as output by mixer 28. Carrier NCO 34 increases or decreases the rate of the locally generated carrier signal. Control of carrier NCO 34 is determined by code loop filter 36, carrier loop filter, inertial aiding device, or some combination of these.

Figure 3:
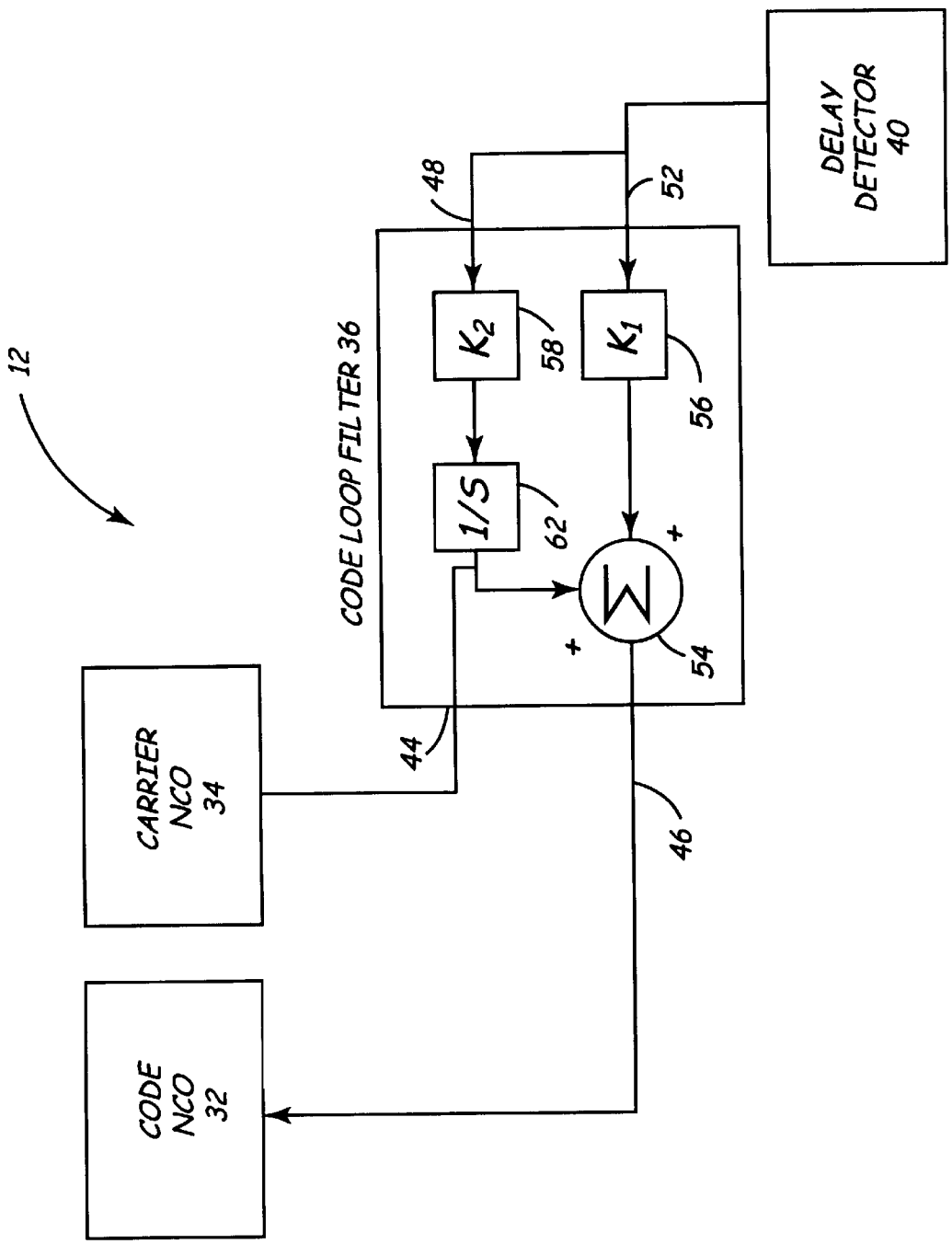
FIG. 3 is a code loop filter of the system in FIG. 2 shown in greater detail.

Code loop filter 36, shown in greater detail in FIG. 3, is a circuit component that generates a rate command for code NCO 32 and carrier NCO 34. Filer 36 is shown located in GPS receiver 12. Filter 36 can alternatively be located in receiver 14. Code loop filter 36 includes an output 44, an output 46, an input 48, and an input 52. Filter 36 further includes a summor 54, a scalar 56, a scalar 58, and an integrator 62. Code loop filter 36 generates the rate command by scaling a code phase error received from delay detector 40 at input 48 with scalar 58 and the code phase error from delay detector 40 at input 52 with scalar 56. The code phase error is scaled by loop gain parameter k1 in scalar 56 and parameter k2 in scalar 58. The scaled code phase error from scalar 58 is integrated by integrator 62. The result of the integration from integrator 62—the rate command—is also a velocity estimate because the rate at which the locally generated code needs to change (i.e. the integral of the scaled code phase error) corresponds to how fast the distance from the GPS satellite is changing (i.e. the relative velocity). The rate command is provided at output 44 to carrier NCO 34.

In one particular embodiment of positioning system 10, the rate command sent to code NCO 32 from output 46 differs from the rate command sent to carrier NCO 34 from output 44 in that the rate command to code NCO 32 adds an error signal parameter ($k_1$) to the velocity estimate.

Referring again now to FIG. 2, mixer 38 accepts as inputs the base band version of the GPS signal output from mixer 28 and the locally generated carrier signal output from the carrier NCO 34.

Delay detector 40 is any of a variety of electrical components which is configured to measure error in the code phase of the GPS signal. Such error measurement may be done by a variety of ways. In one embodiment of positioning system 10, delay detector 40 measures code phase error by comparing (a) the sum of the base band GPS signal from mixer 38 and a half (½) late (i.e. shifted back by half a chip) form of the locally generated code sequence signal with (b) the sum of the base band GPS signal from mixer 38 and a half (½) early (i.e. shifted forward by half a chip) form of the locally generated code sequence signal. A chip is one bit, or symbol, in the pseudorandom (PRN) code. Delay detector 40 sends its measurement of the code phase error to code loop filter 36. Code loop filter 36, as discussed above, instructs code NCO 32 and carrier NCO on how to adjust the locally generated code sequence and carrier signal, respectively, to more accurately approximate the GPS signal transmitted by the GPS satellite.

The operation of positioning system 10 is as follows. Oscillator 17 drives carrier NCO 34 of both GPS receivers 12 and 14 to produce two output signals at the same phase angle γ. The signals produced by each carrier NCO 34 are mixed by mixer 38 with the GPS signals from receivers 12 and 14 at phase angles $\theta_1$ and $\theta_2$, respectively. The mixed signals can be represented by the equations: $I_1 = A_1 \sin(\theta_1 - \gamma)$ and $Q_1 = A_1 \cos(\theta_1 - \gamma)$ for receiver 12 and $I_2 = A_2 \sin(\theta_2 - \gamma)$ and $Q_2 = A_2 \cos(\theta_2 - \gamma)$ for receiver 14, where I=input, Q=quadrature, and A=amplitude.

Mixing the two signals from GPS receivers 12 and 14 with signals from carrier NCO 38 at the phase angle γ produces an overall interference pattern with lower frequency components, depending on the differences of $\theta_1-\gamma$ and $\theta_2-\gamma$. The mixed signals output from mixer 38 have resultant phase angles that can be modeled as two rotating vectors, which describe the instantaneous phase angle relative to a reference point.

Detector 16 receives the mixed signals from GPS receivers 12 and 14 and computes a phase angle $\phi$ for the relative carrier phase angle between the two input signals received by receivers 12 and 14. The mixed signals are placed in vector form.

$$\vec{v}_1 = I_{1i} + Q_{1q}$$

and $$\vec{v}_2 = I_{2i} + Q_{2q}$$

The cross product of the vectors, $$\left| \vec{V}_1 \times \vec{V}_2 \right| = \left| \vec{V}_1 \right| \left| \vec{V}_2 \right| \sin\phi$$

divided by the dot product, $$\vec{V} \cdot \vec{V}_2 = \left| \vec{V}_1 \right| \left| \vec{V}_2 \right| \cos\phi$$

results in tan $\phi$, which is equivalent to $\tan(\theta_1-\theta_2)$ because $\phi=\theta_1-\theta_2$. Thus, the arctangent function can be used to solve numerically for the difference angle, $\theta_1-\theta_2$.

The arctangent function can be shown mathematically by:

$$\tan\phi = \frac{\sin\phi}{\cos\phi} = \frac{\left| \vec{V}_1 \times \vec{V}_2 \right|}{\vec{V}_1 \cdot \vec{V}_2} = \frac{I_1 Q_2 - Q_1 I_2}{I_1 I_2 + Q_1 Q_2}$$

$$= \frac{A_1 A_2 [\sin(\theta_1-\gamma)\cos(\theta_2-\gamma) - \cos(\theta_1-\gamma)]}{A_1 A_2 [\sin(\theta_1-\gamma)\sin(\theta_2-\gamma) + \cos(\theta_1-\gamma)\cos(\theta_2-\gamma)]}$$

Substituting the trigonometric equations for the difference between angles:

$$\sin(a-b) = \sin a \cos b - \cos a \sin b$$

and $$\cos(a-b) = \cos a \cos b + \sin a \sin b$$

into the above equation and solving for $\phi$ results in:

$$\phi = \arctan\left\{\frac{\sin(\theta_1-\theta_2)}{\cos(\theta_1-\theta_2)}\right\} = \theta_1 - \theta_2 = \arctan\left\{\frac{I_1 Q_2 - Q_1 I_2}{I_1 I_2 + Q_1 Q_2}\right\}$$

Thus, the computation of the phase angle $\phi$ is done without having to demodulate the input signals first to get the absolute phase angles and then take their difference for attitude determination.

In operation, positioning system 10 provides for enhanced GPS performance by providing a more accurate estimate of the carrier waveform received from GPS satellites. Such an estimate is particularly important in GPS State 3. GPS signals received during State 3 include only the GPS code and not a determinable GPS carrier signal. However, estimates of the carrier waveform are also helpful to verify the carrier waveform when the carrier can be detected (in GPS State 5, for example).

Conventional positioning systems estimate the waveform of the GPS carrier signal under weak signal conditions using a Kalman filter operating at 1 Hz. In contrast, positioning system 10 provides a second order code tracking loop at a 50 Hz rate to get an estimated measurement of the GPS receiver velocity at its antenna. Using this velocity measurement (output by code loop filter 36) and the last actual carrier measurement and the corresponding last known phase, system 10 provides a direct estimate of what the GPS carrier signal is. Because system 10 gives 50 Hz updates as opposed to the Kalman filter 1 Hz updates, system 10 provides more accurate GPS carrier signal measurements.

Positioning system 10 in GPS attitude determination systems includes two or more GPS receivers with antennae fixed to a platform. As discussed above, positioning system 10 obtains an accurate measurement of the difference in carrier phase between GPS signal representations of GPS receivers 12 and 14. From the carrier phase measurement, platform orientation or attitude is determined.

Advantageously, positioning system 10 provides an external measurement of the GPS carrier signal, which helps detect any carrier cycle slip—a problem in conventional GPS attitude determination designs even in State 5 (where both GPS carrier and code signals are detected).

While the embodiments illustrated in the FIGS. and described above are presently preferred, it should be understood that these embodiments are offered by way of example only. Other embodiments may include, for example, combinations of Kalman filters, dead reckoning techniques, and/or a second order tracking loop. The invention is not limited to a particular embodiment, but extends to various modifications, combinations, and permutations that nevertheless fall within the scope and spirit of the appended claims.

What is claimed is:

1. A system for attitude determination of a platform in global positioning systems (GPS), the system comprising:
   at least two receivers, a first receiver and a second receiver, the receivers each including an antenna, the antenna capable of receiving GPS signals, each receiver producing a representation of the received GPS signals, each receiver using a second order code tracking loop to provide an estimated measurement of a velocity of the receiver at the antenna to estimate how fast a distance from a GPS satellite to the antenna is changing; and
   an attitude determination circuit, the attitude determination circuit calculating platform attitude from the velocity estimated by the receivers.

2. The system of claim 1, further comprising:
   a code generator, the code generator generating a locally generated code sequence for comparison with received GPS signals.

3. The system of claim 2, further comprising:
   a code numerically controlled oscillator (NCO), the code NCO regulating the rate of the code generator.

4. The system of claim 3, further comprising:
   a carrier numerically controlled oscillator (NCO), the carrier NCO regulating the rate by which a locally generated signal is mixed with the received GPS signal.

5. The system of claim 4, further comprising:
   a delay detector, the delay detector measuring code phase error in the GPS signal mixed with the locally generated signal.

6. The system of claim 5, further comprising:
a code loop filter determining a rate of change required of the code NCO and the carrier NCO, wherein the rate of change required corresponds to how fast the distance from the GPS satellite to the antenna is changing.

7. The system of claim 6, wherein the code loop filter determines the rate of change from the code phase error determined by the delay detector.

8. The system of claim 1, further comprising a mixer to combine the locally generated code sequence with the received GPS signals.

9. The system of claim 1, wherein the attitude determination circuit calculates platform attitude from (a) the difference in phase between the GPS signal representation from the first receiver and the GPS signal representation from the second receiver and (b) a determination of which of the antennas of either receiver is closer to the GPS satellite sending the received GPS signal.

10. The system of claim 9, wherein the determination of which of the antennas of the receivers is closer to the GPS satellite sending the received GPS signal includes subtracting the locally generated carrier signal of the first receiver from the locally generated carrier signal of the second receiver.

11. A system for attitude determination of a platform in global positioning systems (GPS), the system comprising:
at least two means for receiving GPS signals, each of said at least two means including;
means for generating a code sequence for comparison with the received GPS signals;
means for regulating the rate of the means for generating a code sequence;
means for measuring code phase error in the GPS signal mixed with the locally generated signal; and
means for using a second order code tracking loop to provide an estimated measurement of a velocity of the receiver at the antenna to estimate how fast a distance from the GPS satellite to the antenna is changing; and
means for calculating platform attitude from data provided by the means for receiving GPS signals.

12. The system of claim 11, further comprising a means for mixing the code sequence with the received GPS signals.

13. The system of claim 11, wherein the code sequence generated for comparing with the received GPS signals is a pseudorandom (PRN) code corresponding to the satellite from which the GPS signal is received.

14. The system of claim 11, wherein the rate by which the locally generated signal is mixed with the received GPS signal is approximately equal to $1/8^{th}$ the frequency of the received GPS signal.

15. The system of claim 11, wherein the rate required of the regulating means is determined from the code phase error.

16. The system of claim 11, further comprising a means for comparing a calculated phase angle of the received GPS signal to the calculated phase angle from another means for receiving GPS signals, whereby a more accurate measurement of the GPS signal is obtained.

17. The system of claim 11, wherein the means for calculating platform attitude further comprises:
determining the difference in phase between a GPS signal representation from the first receiving means and a GPS signal representation from the second receiving means; and
determining which receiving means is closer to the GPS satellite sending the received GPS signal.

18. A method of attitude determination for a platform in global positioning systems (GPS), the method comprising:
receiving a GPS signal into at least two receiving units; and
using a second order tracking loop to provide an estimated measurement of a velocity of the at least two receiving units at an antenna to estimate how fast a distance from a GPS satellite to the antenna is changing.

19. The method of claim 18, wherein the locally generated code sequence is a pseudorandom (PRN) code corresponding to the satellite from which the GPS signal is received.

20. The method of claim 18, further comprises:
mixing a locally generated signal with the received GPS signal.

21. The method of claim 20, further comprises:
measuring code phase error in the GPS signal mixed with the locally generated signal.

22. The method of claim 21, further comprises:
determining a rate of change of the locally generated code sequence from the code phase error in the GPS signal mixed with the locally generated signal.

23. The method of claim 20, further comprising:
comparing the phase of the mixture of the locally generated signal and the received GPS signal to the phase determined by another receiving unit for a more accurate measurement of the actual phase of the GPS signal received.

24. The method of claim 18, further comprising:
determining which of the at least two receiving units is closer to the GPS satellite sending the received GPS signal by subtracting a locally generated carrier signal of the first receiving unit from a locally generated carrier signal of the second receiving unit.

* * * * *